(12) United States Patent
Marshall

(10) Patent No.: US 9,602,436 B2
(45) Date of Patent: *Mar. 21, 2017

(54) SWITCHING DEVICE

(71) Applicant: Micron Technology, Inc., Boise, ID (US)

(72) Inventor: Stephen John Marshall, Lancashire (GB)

(73) Assignee: Micron Technology, Inc., Boise, ID (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/493,720

(22) Filed: Sep. 23, 2014

(65) Prior Publication Data

US 2015/0010014 A1    Jan. 8, 2015

Related U.S. Application Data

(63) Continuation of application No. 12/252,835, filed on Oct. 16, 2008, now Pat. No. 8,891,517.

(30) Foreign Application Priority Data

Oct. 10, 2008    (GB) .................................. 0818114.8

(51) Int. Cl.
*H04L 12/28* (2006.01)
*H04L 12/937* (2013.01)
(Continued)

(52) U.S. Cl.
CPC ........ *H04L 49/254* (2013.01); *H04L 12/5693* (2013.01); *H04L 47/527* (2013.01); *H04L 47/56* (2013.01); *H04L 49/3072* (2013.01)

(58) Field of Classification Search
None
See application file for complete search history.

(56) References Cited

U.S. PATENT DOCUMENTS 5,241,536 A    8/1993  Grimble et al.
5,859,835 A    1/1999  Varma et al.
(Continued)

FOREIGN PATENT DOCUMENTS

EP    0944208 A2    9/1999
EP    1137227 A2    9/2001
(Continued)

OTHER PUBLICATIONS

Search Report for Application No. GB 0818634.8, Dec. 23, 2008, 2 pages.
(Continued)

*Primary Examiner* — Minh-Trang Nguyen
(74) *Attorney, Agent, or Firm* — Barnes & Thornburg LLP

(57) ABSTRACT

A switching device comprising a plurality of ingress ports and a plurality of egress ports. The switching device is arranged to receive data packets through said ingress ports and to forward received data packets to respective ones of said egress ports. The switching device is further arranged to: determine a first time at which a first cell of a selected data packet is to forwarded to one of said egress ports, determine a further time at which a respective further cell of the selected data packet is to be forwarded to said one of said egress ports, store data indicating that said respective further cell is to be forwarded at said determined further time, forward said first cell at said first time, and forward said further cell of said selected data packet at said determined further time.

20 Claims, 13 Drawing Sheets

(51) Int. Cl.
*H04L 12/935* (2013.01)
*H04L 12/54* (2013.01)
*H04L 12/873* (2013.01)
*H04L 12/875* (2013.01)

(56) References Cited

U.S. PATENT DOCUMENTS

| | | |
|---|---|---|
| 6,072,772 A | 6/2000 | Charny et al. |
| 6,160,812 A | 12/2000 | Bauman et al. |
| 6,167,041 A | 12/2000 | Afanador |
| 6,359,861 B1 | 3/2002 | Sui et al. |
| 6,370,148 B1 | 4/2002 | Calvignac et al. |
| 6,618,379 B1 | 9/2003 | Ramamurthy et al. |
| 6,633,580 B1 | 10/2003 | Torudbakken et al. |
| 6,661,774 B1 | 12/2003 | Lauffenburger et al. |
| 6,667,984 B1 | 12/2003 | Chao et al. |
| 6,963,577 B1 | 11/2005 | Tomonaga et al. |
| 7,016,365 B1 | 3/2006 | Grow et al. |
| 7,046,626 B2 | 5/2006 | Davis et al. |
| 7,221,647 B2 | 5/2007 | Moriwaki et al. |
| 7,471,688 B2 | 12/2008 | Kalkunte et al. |
| 7,643,493 B1 | 1/2010 | Sayrafian-Pour |
| 7,733,895 B2 | 6/2010 | Kesselman et al. |
| 8,891,517 B2 * | 11/2014 | Marshall ............... H04L 49/254 370/388 |
| 2002/0136230 A1 | 9/2002 | Dell et al. |
| 2002/0176431 A1 | 11/2002 | Golla et al. |
| 2002/0181483 A1 | 12/2002 | Oki et al. |
| 2004/0071144 A1 | 4/2004 | Beeri et al. |
| 2004/0081184 A1 | 4/2004 | Magill et al. |
| 2004/0090974 A1 | 5/2004 | Balakrishnan et al. |
| 2005/0010676 A1 | 1/2005 | Venkatachalam et al. |
| 2005/0135355 A1 | 6/2005 | Muthukrishnan et al. |
| 2005/0152352 A1 | 7/2005 | Jun et al. |
| 2005/0220114 A1 | 10/2005 | Romano et al. |
| 2005/0271058 A1 | 12/2005 | Atoji |
| 2006/0098673 A1 | 5/2006 | Rabinovitch et al. |
| 2006/0209693 A1 | 9/2006 | Davari et al. |
| 2008/0159145 A1 | 7/2008 | Muthukrishnan et al. |
| 2008/0212472 A1 | 9/2008 | Muacchio et al. |
| 2010/0002714 A1 | 1/2010 | George et al. |

FOREIGN PATENT DOCUMENTS

| | | |
|---|---|---|
| EP | 1324553 A2 | 7/2003 |
| WO | 00/38375 | 6/2000 |

OTHER PUBLICATIONS

International Search Report for Application No. PCT/GB2009/002330, Dec. 11, 2009, 14 pages.

* cited by examiner

SWITCHING DEVICE

The present application is a continuation of U.S. patent application Ser. No. 12/252,835, now U.S. Pat. No. 8,891, 517, filed Oct. 16, 2008, which claims priority, under 35 U.S.C. §119(a), to United Kingdom National Application No. GB 0818114.8, filed Oct. 10, 2008, each of which is hereby incorporated by reference herein.

The present invention relates to a switching device arranged to switch data packets between a plurality of ingress ports and a plurality of egress ports.

It is often necessary to send data between devices in a computer system, for example it is often necessary to connect a processing device to a plurality of input and output devices. Appropriate data communication is achieved by connecting the devices in such a way as to allow them to send data to one another over a physical link, which may be a wired link or a wireless link.

It is known in the art to use a switch to route data from the outputs of one or more devices to inputs of one or more other devices. Such a switch comprises one or more ingress ports arranged to allow the data to be received by the switch, and one or more egress ports arranged to allow the data to be transmitted from the switch.

Circumstances may arise where particular data cannot be transmitted from the switch. This may occur where there is insufficient bandwidth or credit on a connecting link or where a receiving device is busy processing previously received data such that data received at a switch cannot be sent from the switch to a receiving device through the appropriate egress port. Switches may therefore contain a buffer to store data packets waiting to be transmitted from the switch through an appropriate egress port. It is known to store data packets in such a buffer in the form of one or more queues, which temporarily store data packets received from a sending device until those data packets can be sent to a receiving device. These buffers often comprise memory arranged as FIFO (first in, first out) queues.

The problems and complexities of data switch design are well known in the networking and data communication art. There are many conflicting requirements that make the perfect all-purpose solution impractical to achieve. Such conflicting requirements include the need for high link speeds, the need for minimal or zero loss of data, the need for maximal throughput to achieve high bandwidth utilisation, the need for fairness in the allocation of resources, the need for controllable quality of service, the need for scalability of design, and the need to minimise cost through minimising design resources and complexity. Typically, optimising performance conflicts with minimising cost, so that design compromises need to be made based on specific application requirements.

Shared input/output (I/O) is one application for data switching. Sharing of I/O devices can lead to better resource utilisation, scalability, ease of upgrade, and improved reliability. Since cost saving is a major driver in the acceptance of I/O sharing, it is important that the cost of the data switch is minimised to ensure the cost of the switch does not offset the cost advantages provided by I/O sharing. A significant challenge faced in the design of shared I/O switches is to minimise the cost of the switch while balancing the other requirements described above.

One type of commonly used switching technology is the crossbar switch. A crossbar switch is a non-blocking switch fabric capable of connecting N inputs to N outputs across a switch core in any one-to-one combination. That is, any input may be connected to any non-busy output. Inputs are connected to the outputs via a matrix of input and output lines with switches where the lines cross.

Where data packets received at a switch are buffered, at a particular time there is a need to select a data packet to be forwarded to the relevant egress port, and a further need to schedule when a selected data packet should be forwarded. A switch design should ideally maximize the use of the switch core (that is, maximise the number of cells that are switched in each timeslot) while ensuring that data packets are forwarded in a way that is fair, in the sense that all connections through the switch are given an equal opportunity to transfer data. These requirements are sometimes made more difficult by the need to support varying link rates between different ingress and egress ports. In many current switch designs, the selection of data packets for forwarding, and their scheduling is carried out in a single operation.

In order to enhance efficiency, many switches operate using fixed sized cells. Data which is to be transmitted through the switch is often encapsulated in one or more such cells for transfer through the switch from an input to an output. The use of fixed sized cells allows efficiency to be improved given that a switch core can be designed to optimally transfer the fixed quantity of data in a particular time slot. Where data packets of variable size are received at a switch, these data packets may be encapsulated in one or more fixed size cells by components of the switch to enable transfer through the switch.

While the use of fixed size cells can improve the efficiency of a switching device there remains a need for a switch which can efficiently and effectively process received data packets, and more particularly a switch which can effectively select data packets to be forwarded to a relevant egress port, and efficiently schedule the forwarding of a selected data packet.

It is an object of embodiments of the present invention to provide a switching device.

According to a first aspect of the present invention, there is provided, a switching device comprising a plurality of ingress ports and a plurality of egress ports. The switching device is arranged to receive data packets through said ingress ports and to forward received data packets to respective ones of said egress ports. The switching device is further arranged to determine a first time at which a first cell of a selected data packet is to be forwarded to one of said egress ports and determine a further time at which a respective further cell of the selected data packet is to be forwarded to said one of said egress ports. The switching device is arranged to store data indicating that said respective further cell is to be forwarded at said determined further time, to forward said first cell at said first time and to forward said further cell of said selected data packet at said determined further time.

The switching device may determine a plurality of further times at which respective further cells of said selected data packet are to be forwarded to said one of said egress ports, and for each of said plurality of further cells, data indicating the respective determined time at which the further cell is to be forwarded to said one of said egress ports may be stored. Each of said further cells of said selected data packet may be forwarded to said one of the egress ports at the respective determined time.

The first aspect of the invention therefore provides a switching device which is arranged to determine both a first time at which a first cell should be forwarded and a at least one further time at which a further cell should be forwarded. In this way, a single integrated scheduling operation is provided which allows times at which a plurality of cells are to be forwarded to be determined. This is particularly useful in that it allows a single decision to be made relating to when all cells making up a particular data packet should be forwarded. Scheduling in this way can be used to effectively maintain inter-cell dependencies. For example, cells may be forwarded so as to arrive at an egress port at desired predetermined time intervals by forwarding such cells in a manner determined by the desired predetermined time intervals.

The at least one further time may be determined according to a characteristic of the egress port to which the selected data packet is to be forwarded. For example, the characteristic may a data rate of an egress link associated with said one of said egress ports. Such an egress link may connect an egress port to a device. In this way, the at least one further time may be selected such that one or more further cells of the data packet are forwarded based upon a rate at which cells are forwarded from the egress port along the associated egress link. Such an approach can act to ensure that cells always arrive at the egress port in time for their onward transmission.

The switching device may further comprise a memory storing a data structure comprising an ordered plurality of slots, each slot being associated with a respective time. Storing data indicating that a respective further cell is to be forwarded at a determined further time may comprise storing data identifying said data packet in one of said slots indicating said determined further time. The data structure may take the form of a pipeline comprising a plurality of pipeline slots. The slots may each store data identifying a data packet and data identifying a cell of that data packet.

Data packets received through said ingress ports may be stored in at least one buffer. The or each buffer may be associated with a respective single one of said plurality of ingress ports such that the or each buffer stores data packets received through a single ingress port. A plurality of buffers may be associated with each ingress port.

The or each buffer may take any suitable form. For example the or each buffer may be a queue such as a first in, first out (FIFO) queue.

The or each buffer may be arranged to store a data packet by storing cells of that data packet. For example, the or each buffer may be arranged to store a data packet by storing cells of that data packet as a linked-list.

Each buffer may be arranged to store a plurality of pointers, each pointer indicating the first cell of a respective data packet. The pointers may be stored in a queue, such as a FIFO queue.

The switching device may be arranged to generate a set of candidate data packets from packets stored in said at least one buffer. The generation of a set of candidate data packets is sometimes referred to herein as arbitration. Data packet to be forwarded may be selected from said set of candidate data packets. The selection of data packets from the set of candidate data packets is sometimes referred to herein as scheduling. The switching device may be arranged to carry out said generating and said selecting independently of one another.

The generating may comprise determining whether a given data packet can be accepted by an egress port to which it is to be forwarded and including said given data packet in a set of candidate data packets only if said data packet can be accepted by the egress port to which it is to be forwarded.

A plurality of sets of candidate data packets may be created, each set comprising data packets received through a single one of said ingress ports. The switching device may be arranged to make selections from said plurality of sets of candidate data packets independently of one another.

The switching device may be arranged to forward cells of different data packets in an interleaved manner. Such interleaving can improve the efficiency with which data packets are forwarded through the switching device.

Each cell may be of an equal predetermined size. The use of cells of equal size can improve the efficiency of the switch. It will be appreciated that, in general terms, aspects of the invention can be implemented with cells and data packets of any convenient size. The data packets can be of fixed or variable size.

The switching device may be arranged to forward cells of received data packets at a data rate greater than the data rate of an egress link associated with any one of said plurality of egress ports. For example, the switching device may be arranged to forward cells of received data packets at a data rate at least twice the data rate of an egress link associated with any one of said plurality of egress ports. Forwarding cells in this way can again improve efficiency.

The data structure may comprise first slots defining a first phase and second slots defining a second phase. In one embodiment, for any two adjacent slots of said data structure a first slot is part of said first phase and a second slot is part of said second phase.

If no data is stored in slots of said second phase the switching device may attempt to store data in slots of said first phase. This can maximise use of the first phase while keeping the second phase free for transmission of future data packets. This can be useful if such future data packets require transmission at a higher data rate.

If data is stored in at least some slots of said second phase, but data is not stored in determined slots of the second phase, the switching device defers storing data in slots of the first phase. This again maximises the use of one phase while keeping the other phase empty.

The switching device may be adapted to connect a plurality of computing devices to a plurality of input/output devices. The switching device may use any suitable protocol, for example the PCI Express protocol.

According to a second aspect of the present invention, there is provided a switching device comprising a plurality of ingress ports and a plurality of egress ports. The switching device is arranged to receive data packets through said ingress ports and to forward received data packets to respective ones of said egress ports. The switching device further comprises a plurality of ingress modules associated with said ingress ports, each ingress module being arranged to receive data packets from a respective single one of said ingress ports. Each ingress module comprises at least one buffer for storage of received data packets, an ingress arbiter for selecting data packets from said at least one buffer as candidate data packets for forwarding to an egress port, and an ingress scheduler for scheduling transmission of selected ones of said candidate data packets to destination egress ports.

The second aspect of the invention therefore provides a switching device in which arbitration and scheduling functionality is provided for each ingress port individually. Such an approach removes any inter-dependencies between operation of the ingress ports and improves efficiency while also promoting scalability.

The ingress arbiter and the ingress scheduler may operate independently of one another.

According to a third aspect of the present invention, there is provided a switching device comprising a plurality of ingress ports and a plurality of egress ports. The switching device is arranged to receive data packets through said ingress ports and to forward received data packets to respective ones of said egress ports. The switching device further comprises an ingress module arranged to receive data packets from at least some of said ingress ports. The ingress module comprises at least one buffer for storage of received data packets, an ingress arbiter for selecting data packets from said plurality of buffers as candidate data packets for forwarding to an egress port, and an ingress scheduler for scheduling transmission of selected ones of said candidate data packets to destination egress ports. The ingress arbiter selects data packets based upon an ability of an egress port to which a data packet is to be forwarded to accept a data packet.

The third aspect of the invention therefore provides a switching device in which scheduling decisions are made by a scheduler which selects between candidate data packets which are destined for egress ports which currently have availability to receive a data packet. Such scheduling can improve switch efficiency.

The ingress arbiter and the ingress scheduler may operate independently of one another.

It will be appreciated that features presented in the context of one aspect of the invention in the preceding description can equally be applied to other aspects of the invention.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals. Methods for operating switching devices are also provided by the invention.

Embodiments of the present invention are now described, by way of example, with reference to the accompanying drawings, in which.

Figure 1:
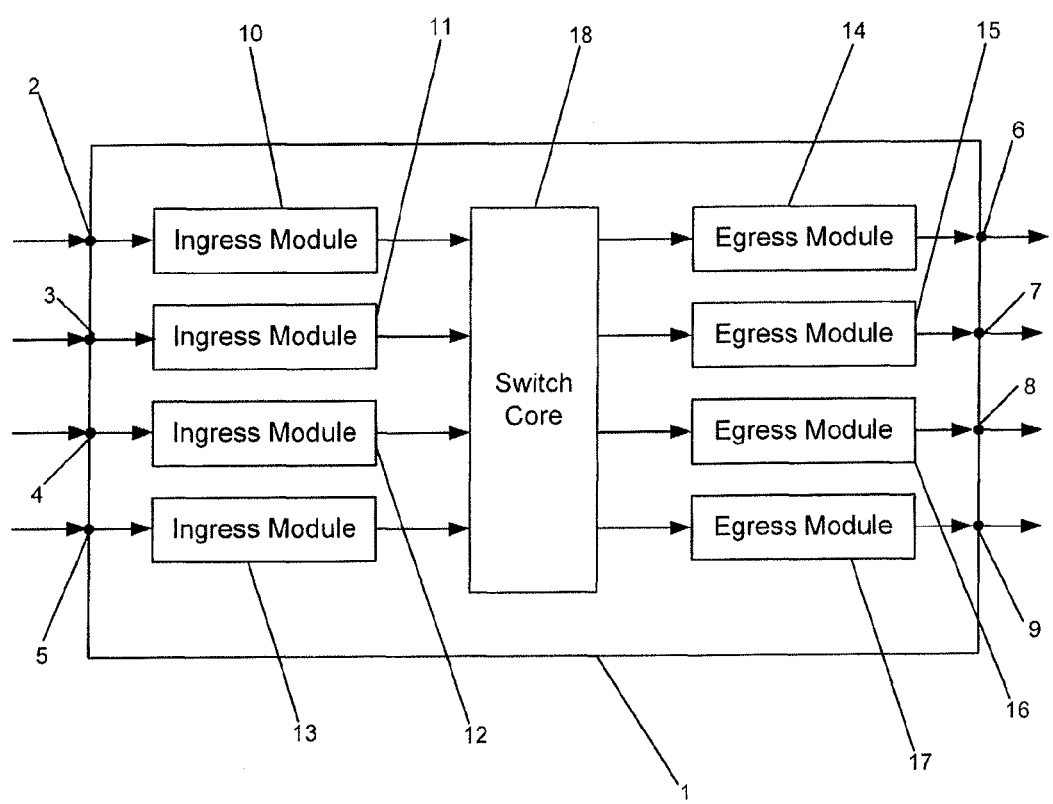
FIG. 1 is a schematic illustration of a switch having four ingress ports and four egress ports.

FIG. 1 schematically illustrates a switch 1 according to an embodiment of the present invention. The switch 1 has four ingress ports 2, 3, 4, 5 and four egress ports 6, 7, 8, 9. The ingress ports 2, 3, 4, 5 have respective associated ingress modules 10, 11, 12, 13. The egress ports 6, 7, 8, 9 have respective associated egress modules 14, 15, 16, 17. A switch core 18 connects the ingress modules 10, 11, 12, 13 to the egress modules 14, 15, 16, 17. Data packets are received through the ingress ports 2, 3, 4, 5 and processed by the ingress modules 10, 11, 12, 13 before being switched to an appropriate egress port by the switch core 18, via the appropriate egress module 14, 15, 16, 17.

The ingress modules 10, 11, 12, 13 are now described in further detail with reference to FIG. 2, which illustrates, by way of example, the ingress module 10. It will be appreciated that the other ingress modules 11, 12, 13 can be similarly configured.

Figure 2:
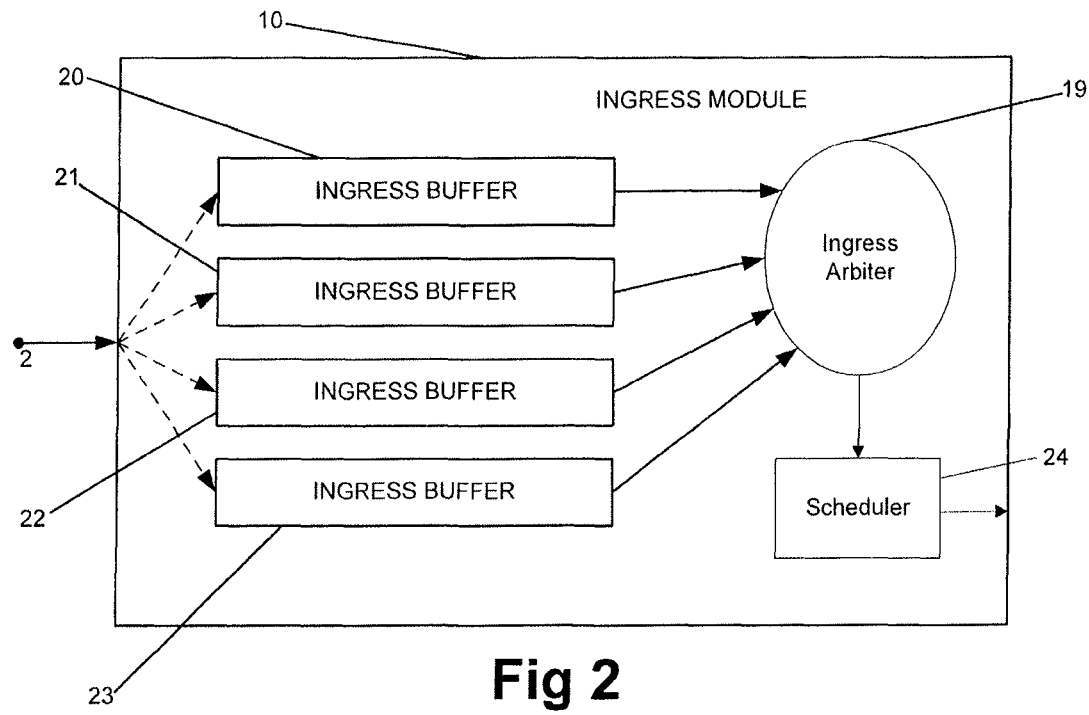
FIG. 2 is a schematic illustration of an ingress module of the switch of FIG. 1.

Referring to FIG. 2, it can be seen that the ingress module 10 comprises four ingress buffers 20, 21, 22, 23 arranged to store data packets received at the ingress port 2. The ingress buffers 20, 21, 22, 23 may, in some embodiments, be implemented as virtual output queues, wherein each of the ingress buffers is associated with one of the egress ports 6, 7, 8, 9 such that packets received at the ingress port 2 destined for a particular egress port are stored in an appropriate ingress buffer. In an alternative embodiment, the ingress buffers may be shared buffers, wherein packets are added to the ingress buffers 20, 21, 22, 23 according to an appropriate allocation scheme such as, for example, a round-robin allocation scheme. The ingress buffers may be arranged as first-in, first-out queues, or in any other appropriate arrangement.

The ingress module 10 further comprises an ingress arbiter 19 arranged to arbitrate between the ingress buffers 20, 21, 22, 23. The arbiter 19 selects one or more data packets (typically up to four) from the ingress buffers 20, 21, 22, 23 to form a group of candidate data packets which are available for selection by a scheduler 24. Selection of ingress buffers 20, 21, 22, 23 from which the candidate data packets should be chosen by the ingress arbiter 19 may be based upon any suitable selection algorithm, such as a simple round-robin selection algorithm. Other appropriate selection algorithms which can be used by the ingress arbiter 19 include a weighted round-robin algorithm.

The scheduler 24 controls the transmission of data packets from the ingress module 10 through the switch core 18 to help ensure maximal utilisation of the bandwidth of the switch core 18. The scheduler 24 selects data packets for transmission through the switch core 18 from the candidate data packets selected by the ingress arbiter 19.

It will be appreciated that each of the ingress modules 10, 11, 12, 12 comprises a respective scheduler. This means that scheduling decisions are made independently for each ingress module, thereby providing a distributed scheduling scheme. Such a distributed scheduling scheme promotes scalability.

Figure 3:
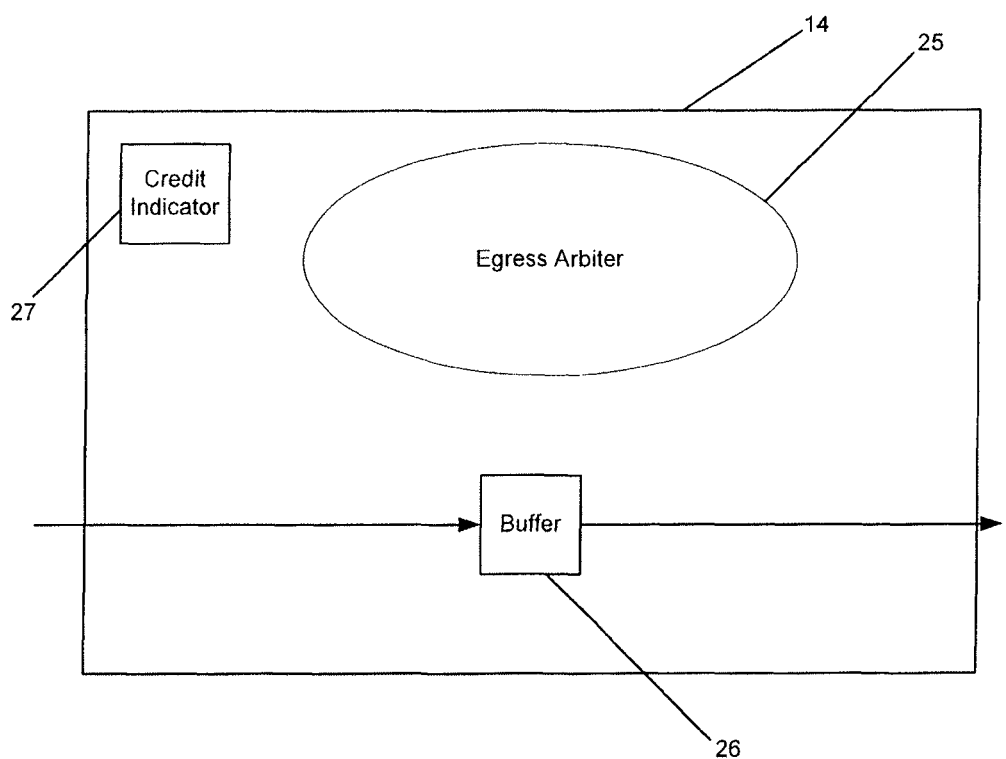
FIG. 3 is a schematic illustration of an egress module of the switch of FIG. 1.

FIG. 3 schematically illustrates the egress module 14. It is to be appreciated that the other egress modules 15, 16, 17 are similarly implemented. It can be seen that the egress module 14 comprises an egress arbiter 25 arranged to select a data packet offered by one of the ingress modules 10, 11, 12, 13 for transmission to the egress port 6. The egress module 14 further comprises a single packet buffer 26 to store an incoming data packet received from an ingress module. In some cases it is not necessary for an egress module to have a buffer, as data packets can be forwarded to the relevant egress port immediately without storage at the egress module. The use of the single packet buffer 26 may be beneficial however, to allow the switch core 18 to complete a data packet transfer in the event that there is a problem with the link from an egress port, causing a transient delay in transmitting a data packet from that egress port. Where single packet buffering is implemented in the egress module by storing the data packet in the single packet buffer 26, the switch core can complete the transfer of the data packet to the egress module, and the egress module can forward the data packet from the egress port when the problem with the link has cleared. Additionally, the provision of the single packet buffer 26 is useful where data is received at an egress port at a different transmission rate to that at which it is transmitted from the egress port. In such a case the single packet buffer 26 can buffer a received data packet so as to allow the differing transmission rates to be properly handled.

A credit state indicator 27 is set by the egress module 14 to indicate whether the egress module 14 has sufficient credit to receive a data packet. In this embodiment, the credit state indicator is a simple binary flag, where a value of '0' indicates that the egress module 14 is not able to receive a data packet, and a value of '1' indicates that the egress module 14 is able to receive a data packet. In other embodiments, the credit state indicator may indicate a quantity of credit an egress module has available, which can be compared with the size of a particular data packet to determine if that egress module can accept that particular data packet.

The arbiter 19 of the ingress module 10, and the arbiters of the ingress modules 11, 12, 13 use the credit state information provided by each egress module to determine whether a particular data packet stored in one of the ingress buffers should be selected as a candidate data packet. In one embodiment, an arbiter may select a data packet for processing and determine an egress port to which it is to be forwarded. The arbiter may then query the credit state information provided by the appropriate egress module, and select the processed data packet as a candidate data packet if but only if the appropriate egress module indicates that it has credit to accept a data packet. Given that each of the ingress modules 10, 11, 12, 13 has a respective arbiter it will be appreciated that arbitration is distributed between ingress modules. Further, the selection of candidate data packets by an arbiter is independent of scheduling decisions made by a scheduler.

Figure 4:
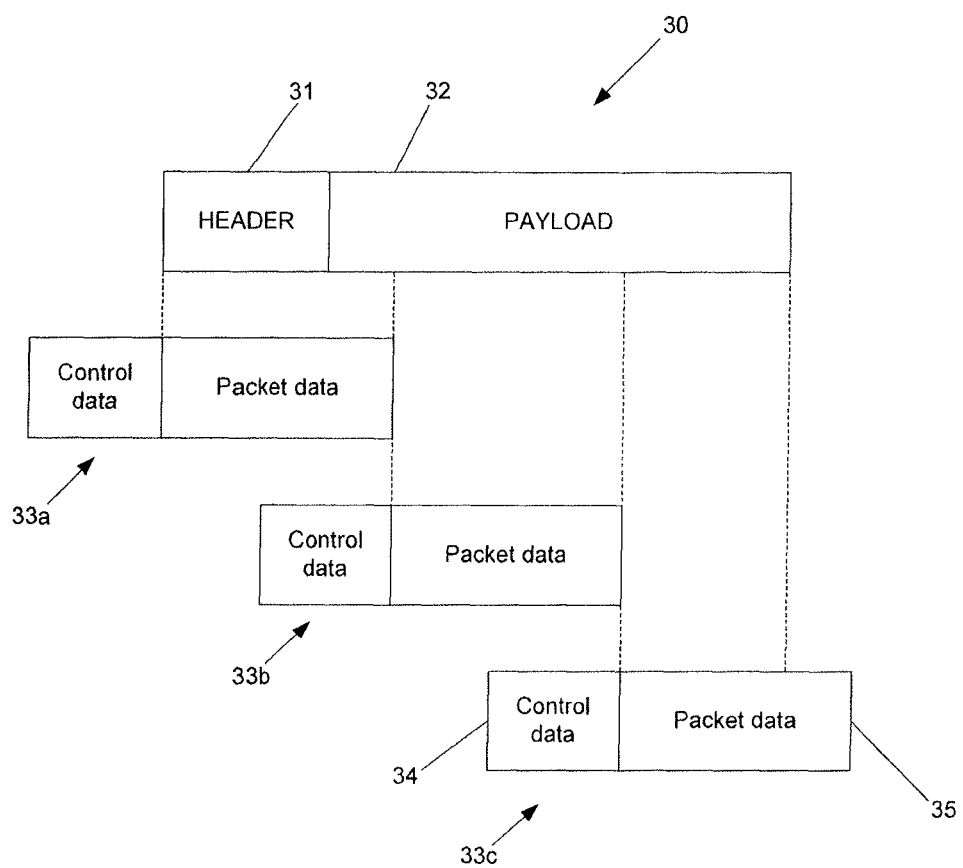
FIG. 4 is a schematic illustration of a data packet and a number of cells representing the data packet as processed by the switch of FIG. 1.

While the switch 1 operates at a data packet level, the switch core 18 is a cell based switch core that processes fixed-length cells in predetermined timeslots. Data packets are segmented into cells by the ingress module 10 and are stored in the ingress buffers 20, 21, 22, 23 in the form of their constituent cells. FIG. 4 schematically illustrates the segmentation of a packet 30 into cells of fixed-length.

The data packet 30 comprises a header 31 and a payload 32. The header 31 typically has a fixed length while the payload 32 has a variable length depending upon the quantity of data transmitted in the data packet. It can be seen that the data packet 30 is segmented into three cells 33a, 33b, 33c. Each cell comprises a control data portion and a packet data portion. For example, the cell 33c comprises a control data portion 34 and a packet data portion 35.

The control data portion of each cell comprises information used to link the cells of a particular data packet so as to allow the data packet to be reconstructed. For example the control data of a particular cell may contain a pointer to the next cell of that data packet (e.g. the control data of the cell 33a may include a pointer to the cell 33b, and so on). The control data portion 34 may further comprise a flag to indicate whether a cell is a first cell of a data packet or a last cell in a data packet. The packet data portion of each cell comprises part of the data of the data packet which is represented by that cell, that data being taken from the header 31 of the data packet, the payload 32 of the data packet, or both.

The switching device 1 may use the PCI Express protocol. Data packets used by the PCI Express protocol for read/write transactions (known as Transaction Layer Packets, or TLP) comprise a header portion and a payload portion of the type described above with reference to the data packet 30. The payload portion of TLPs may vary in size up to a maximum value which is determined when the PCI Express system is configured. A maximum payload size of two-hundred and fifty-six bytes is typical. The header portion of TLPs has a length of twelve bytes where thirty-two bit addressing is used and a length of sixteen bytes where sixty-four bit addressing is used. Each cell 33a, 33b, 33c has a fixed length. The packet data portion of each cell has a length of thirty-two bytes, and can therefore hold up-to thirty-two bytes of TLP data. The control data portion of each cell has a length of twenty bits In such an arrangement nine cells are required to represent a TLP with a payload of two hundred and fifty-six bytes.

It will be apparent to those skilled in the art that the present invention can easily support TLPs with larger header and/or payload portions, and similarly can be used with cells of different sizes to those described above.

Figure 5A:
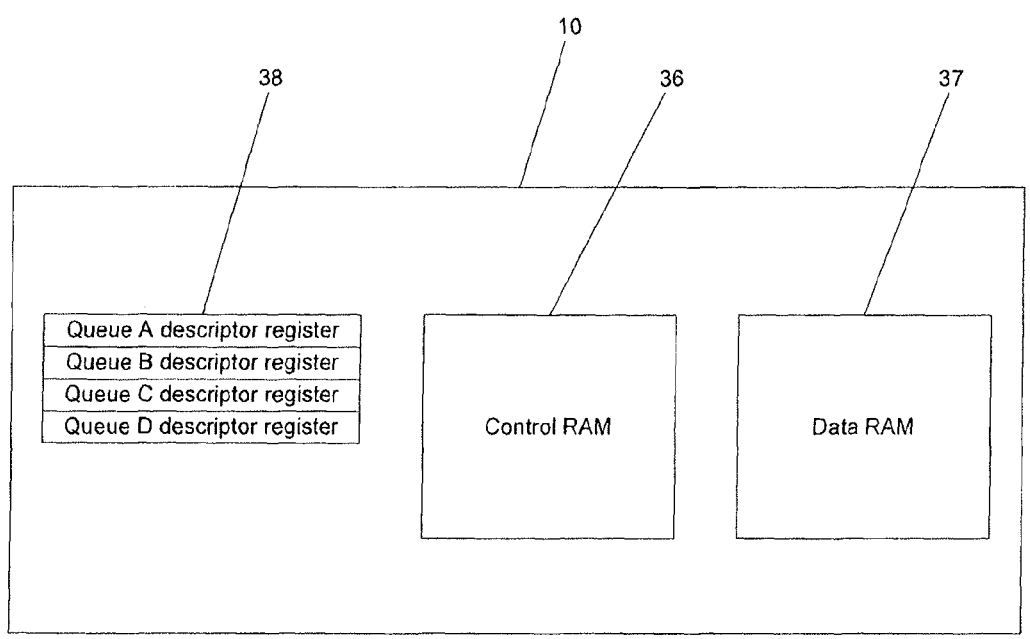
FIG. 5A is a schematic illustration of components of the ingress module of FIG. 2.

FIG. 5A shows the ingress module 10 in terms of its hardware components. It can be seen that the ingress module 10 comprises control RAM 36, and data RAM 37. The control RAM 36 and data RAM 37 are shared by the four ingress buffers 20, 21, 22, 23 provided by the ingress module 10. Each of the ingress buffers is implemented to act as a first-in first out (FIFO) queue. The ingress module 10 further comprises queue descriptor registers where one queue descriptor register is provided for each ingress buffer. The queue descriptor registers indicate how data in the control RAM 36 and data RAM 37 relates to the four ingress buffers.

Figure 5B:
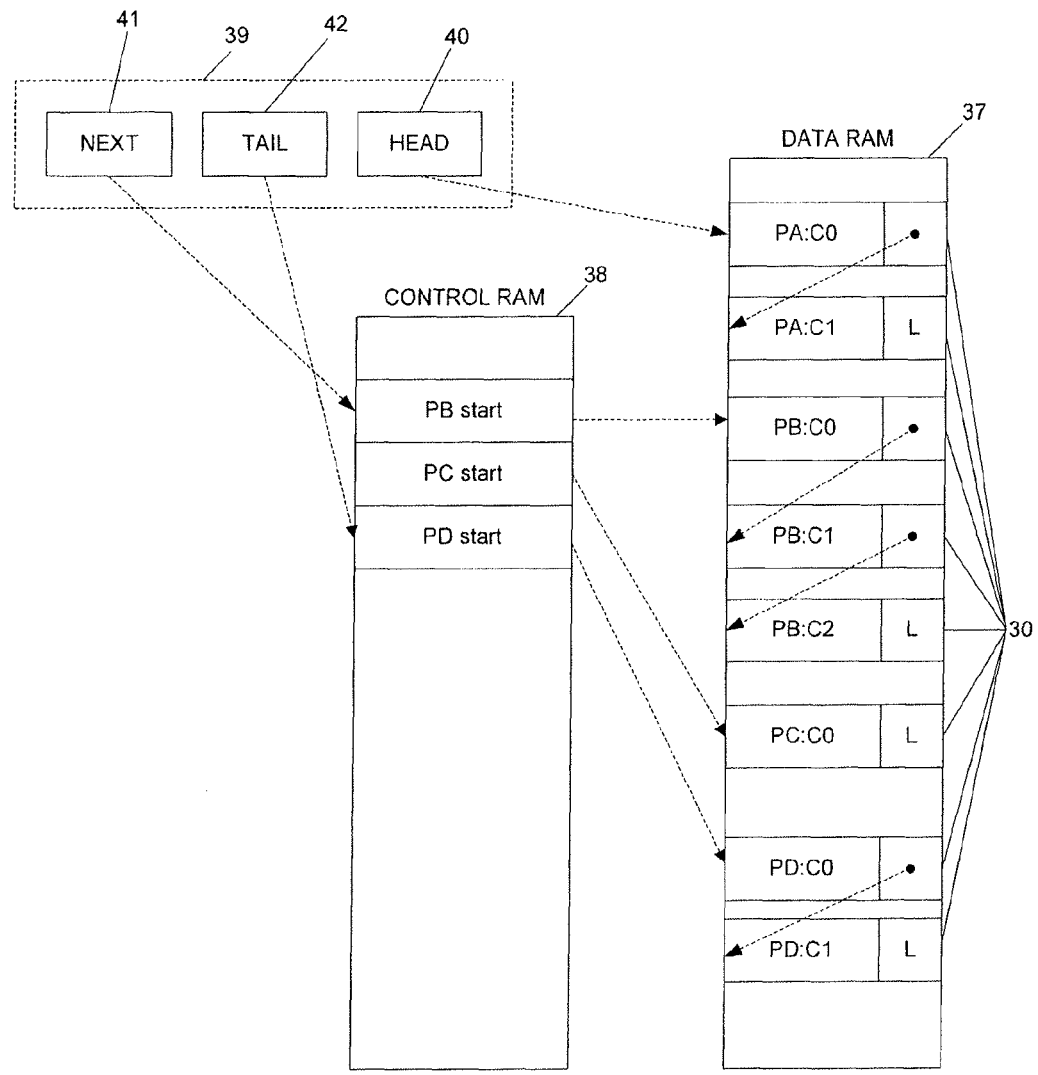
FIG. 5B is a schematic illustration showing how an ingress buffer is stored in the ingress module shown in FIG. 5A.

FIG. 5B schematically illustrates how data associated with a single ingress buffer is stored in the control RAM 36 and the data RAM 37.

Data packets are stored in terms of their constituent cells in the data RAM 37. Cells are stored in the form of a linked list, whereby each cell includes a pointer to a next cell in the list as part of its control data. In this way cells of a particular packet need not be stored adjacent to one another in the data RAM 37, given that a following cell can be identified from the pointer included in the control data of a particular cell. A control flag 'L' is included in the final cell of a data packet in place of an address pointer. The data RAM 37 stores four data packets, PA, PB, PC and PD. The data packet PA is split into two cells (identified by the indices C0 and C1) and the data packet PB is split into three cells (identified by the indices C0, C1 and C2). The data packet PC is stored as a single cell (identified by the index C0) while the data packet PD is split into two cells (identified by the indices C0 and C1).

A queue descriptor register 39 associated with the described buffer comprises a head pointer 40 to the data packet at the head of the queue provided by the ingress buffer (the data packet PA in FIG. 5B). Pointers to the first cells of each other data packet in the queue are stored sequentially in the control RAM 36. That is, control RAM 36 stores a pointer to the first cell of the data packet PB, a pointer to the first cell of the data packet PC and a pointer to the first cell of the data packet PD. In this way, the control RAM 36 stores an ordered list of data packets in the queue which follow the first data packet identified by the head pointer 40 provided as part of the queue descriptor register 39.

The queue descriptor register 39 further comprises a next pointer 41 which identifies a data packet in the control RAM 38 which follows the data packet at the head of the queue. The queue descriptor register also comprises a tail pointer 42 which identifies the last data packet in the queue by identifying the pointer to the last data packet (the data packet PD in this case) stored in the control RAM 36.

Given that the queue is operated on a FIFO basis, the packet removed from the queue is always that indicated by the head pointer 40 of the queue descriptor register 39. When the data packet indicated by the head pointer 40 leaves the queue, a pointer from a next data packet in the queue is moved from the control RAM 36 to the head pointer 40 of the queue descriptor register 39 thereby making the next packet in the queue available for selection.

Operation of the scheduler 24 (FIG. 2) is now described in more detail. Data packets are delivered from an ingress module to an egress module at a rate which is such that the egress module can transmit received data packets immediately without any requirement to store data packets at the egress module prior to onwards transmission. This type of packet delivery to egress modules is described as 'just-in-time' delivery.

The scheduler transmits data packets on a timeslot basis. Each timeslot is a single clock cycle in which a cell of predetermined fixed-length may be transferred from a particular ingress module with which the scheduler is associated to the relevant egress module. As described above, scheduling decisions are made independently for each ingress module.

Once a first cell of a data packet has been delivered to an egress module, subsequent cells of that data packet are transmitted at regular intervals, those intervals matching the onward transmission rate of the egress module. Upon transmitting the first cell of a data packet through the switch core 18, the scheduler 24 therefore reserves timeslots for the remaining cells of that data packet so as to ensure that those subsequent cells are delivered to the egress module in a timely manner. The header of each data packet, containing a payload length field, is contained within the first cell of a data packet. The payload length is extracted by the scheduler 24 and processed to determine how many cells a particular data packet comprises, and therefore, how many timeslots should be reserved to ensure timely delivery of all cells which make up the data packet.

It has been explained that some embodiments of the invention use the PCI Express protocol. PCI Express links between devices or between a switch and a device comprise one or more bidirectional lanes, one direction for receiving data packets, the other for transmitting data packets. The number of lanes in a particular link is denoted by Nx, where N is the number of bidirectional lanes. For example, an 8× link has eight bidirectional lanes. Each link has an associated data rate. Different links may have different data rates, for example, a standard data rate (SDR) of 2.5 Gb/s or a double data rate (DDR) of 5 Gb/s. The particular data rate of a particular link is dependent upon the bandwidth required for the particular application along with the level of PCI Express support offered.

In the described embodiment the scheduler operates at double the rate of the fastest link connecting one of the ingress ports 2, 3, 4, 5 or one of the egress ports 6, 7, 8, 9 to another PCI Express device. This is known as 2× over-speed operation. This means the scheduler of a particular ingress module can transfer data at a rate sufficient to keep two egress links operating at 8×DDR continuously transmitting data using a just-in-time scheduling strategy.

Figure 6:
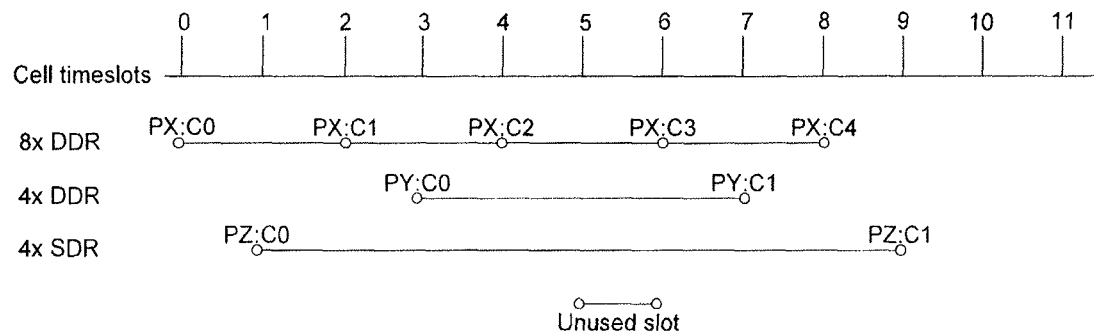
FIG. 6 is a timeline showing how cells may be scheduled in an interleaved manner.

A scheduler of an ingress module may interleave cells of data packets destined for different egress ports, as illustrated in FIG. 6. This is particularly useful (but not limited to) situations where egress modules of a switching device operate at different data rates.

Referring to FIG. 6, three data packets PX, PY, PZ are stored at the ingress module 10 destined for the egress ports 6, 7, 8 respectively. The egress port 6 is connected to a link running at 8×DDR, the egress port 7 is connected to a link running at 4×DDR and the egress port 8 is connected to a link running at 4×SDR. Each of the data packets PX, PY, PZ has been selected by the ingress arbiter 19 as a candidate data packet for transmission through the switch core 18 and is offered to the scheduler 24 for selection for transmission.

The data packet PX comprises five cells indicated PX:C0 to PX:C4 and, as it is destined for the egress port 6, running at 8×DDR, requires that a cell is transmitted every second timeslot, i.e. the timeslots 0, 2, 4, 6 and 8 to ensure just-in-time delivery. This leaves the intervening timeslots available for transmission of cells of the other data packets PY, PZ. The data packet PZ comprises two cells PZ:C0, PZ:C1. Given that the data packet PZ is to be forwarded to the egress port 8 which is connected to a link running at 4×SDR, a cell is transmitted every eighth timeslot to be delivered just-in-time to the egress port 8. The data packet PZ may be transmitted in the free timeslots 1 and 9 leaving timeslots 3, 5, 7 available for cells of the final data packet PY. The data packet PY comprises two cells PY:C0 and PY:C1. Given that the data packet PY is to be forwarded to the egress port 7 which is connected to a link running at 4×DDR, a cell is transmitted every fourth timeslot to be delivered just-in-time to the egress port 7. The cells of the data packet PY may therefore be accommodated in timeslots 3 and 7. This leaves a single timeslot, the timeslot 5 unused.

It is to be noted that a data packet is only scheduled for transmission when the scheduler 24 determines that there is sufficient bandwidth available to transmit all cells of that data packet. Otherwise, transmission of the whole packet is delayed until sufficient bandwidth is available.

Scheduling decisions are made on a packet basis with the subsequent cells having a predetermined schedule. Once a first cell of a data packet is scheduled, timeslots are reserved for any subsequent cells of that data packet. A scheduling pipeline is used to record future timeslot reservations. An egress port connected to an egress link operating at 8×DDR will require a data packet cell to be supplied every two timeslots, while egress ports connected to egress links operating at 4×DDR and 8×SDR will require a cell to be supplied every fourth timeslot. Egress ports connected to links operating at 4×SDR will require a cell to be supplied every eighth timeslot. In the described embodiment, an eight-stage pipeline is used. An eight-stage pipeline, when operated as described below, allows data packet destined for an egress port connected to a link operating at the slowest rate (i.e. 4×SDR) to be properly handled.

Where an egress port is connected to an egress link operating at a data rate lower than 4×SDR, it may be necessary to supply cells less frequently. This can be achieved by providing a longer pipeline. Alternatively, the ingress arbiter 19 may be configured to only offer data packets to a scheduler where an egress port can accept that data packet. In such a case a shorter pipeline can be effectively used. That is, an eight-stage pipeline can be used for transfer rates slower than 4×SDR on the basis that a data packet is transmitted to an egress port only when the single packet buffer 26 (FIG. 3) of the egress module associated with that egress port can accept that data packet. This can be achieved using the credit state indicator 27 provided by the egress modules as described above.

Figure 7:
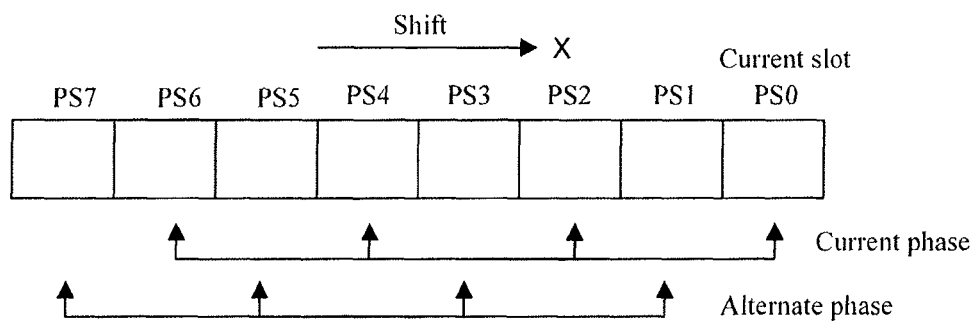
FIG. 7 is a schematic illustration of a scheduling pipeline used by the scheduler of the ingress module of FIG. 2.

FIG. 7 illustrates a scheduling pipeline according to an embodiment of the present invention. The pipeline is stored and managed by the scheduler and is implemented using registers which provide parallel access to all pipeline slots.

Referring to FIG. 7, a pipeline is shown having eight slots, PS0 to PS7. The pipeline slot PS0 stores the reservation for the current timeslot with each of the slots PS1 to PS7 used to store the reservations for subsequent sequential timeslots. After each timeslot the pipeline shifts by one pipeline slot in the direction shown by the arrow X such that the reservations of slots PS1 to PS7 move to slots PS0 to PS6. Where all cells of a data packet already scheduled for transmission could not be scheduled in the pipeline slots PS0 to PS7 before the pipeline is shifted, it may be necessary to add a new cell in slot PS7 after the pipeline shifts. For example, if a cell belonging to a data packet scheduled for a 4×SDR egress port is scheduled in slot PS0, no further cells of that data packet can be scheduled in the eight-stage pipeline at that time. When the cell scheduled at PS0 is transmitted and the pipeline shifted, the next cell of that data packet is scheduled in slot PS7.

Similarly, by way of a further example, where a data packet is destined for a 4×DDR egress port and two or more additional cells of that data packet remain to be transmitted after a cell of that data packet currently scheduled in slot PS0, a reservation for one of those additional cells will already exist at slot PS4, while the other remaining cells will not yet be scheduled. After the cell in slot PS0 is transmitted and the pipeline shifted, the existing reservation is shifted to slot PS3 and the next cell of that data packet is scheduled in the slot PS7.

As another example, where a data packet is destined for an 8×DDR egress port and more than three additional cells remain to be transmitted after a cell of that data packet currently scheduled in the slot PS0, reservations for three of those additional cells will pre-exist at slots PS2, PS4 and PS6. When the cell at PS0 is transmitted and the pipeline shifts, the existing reservations are shifted to PS1, PS3 and PS5 and a new reservation of a cell of that data packet is created at slot PS7.

As the scheduler operates at twice the speed of the fastest egress link, a two-phase scheduling algorithm is used. Pipeline slots PS0, PS2, PS4 and PS6 are classified as current phase slots, while pipeline slots PS1, PS3, PS5 and PS7 are classified as alternate phase slots.

Once the first cell of a data packet is scheduled for transmission, unless it is the only cell of that data packet (i.e. unless the data packet is a single cell data packet), pipeline slots for the next cells of the data packet are reserved (to the limit of the pipeline). Similarly when subsequent cells of a data packet reach the head of the pipeline, further pipeline slots are reserved as necessary. A sequence count is stored alongside each reservation for a particular data packet in the pipeline. In the described embodiment this is a decrementing cell number where cell number 0 indicates a last cell of a packet. On processing the slot at the head of the pipeline, the remaining cell-count is decremented and fed back into the slot reserved for the next cell. From the remaining cell-count, and the required transmission rate, the scheduler can determine whether a further reservation needs to be made at the tail of the pipeline. It will be appreciated that the remaining cell-count can be different from the cell number associated with the slot at the head of the pipeline where more than one cell of a data packet is stored in the pipeline.

It is necessary to ensure that a judicious selection of packets is made in order to avoid one data packet delaying transmission of future data packets. For example, the scheduling of two data packets destined for egress ports connected to relatively slow links in consecutive timeslots would inhibit the scheduling of higher rate data packets and therefore reduce efficiency. This is because these data packets would require that slots be reserved in both the current and alternate phase at regular intervals, and these reservations could prevent the transmission of data packets at a faster rate in both the current and alternate phases.

By deferring the scheduling of packets until the alternate phase in some circumstances the efficiency can be maximized. For example, two data packets destined for egress ports connected to relatively slow links may be scheduled in the same phase, leaving the alternate phase for the transmission of data packets which are destined for egress ports connected to faster links. There is therefore an advantage in maximising the use of the pipeline slots in one phase, and thereby maintaining a minimum usage of the other phase, leaving the other phase available for a future (as yet unavailable) transmission at a higher rate.

A packet is defined as "deferred" if there is sufficient residual bandwidth in the alternate phase for its transmission. A deferred packet will have priority for scheduling in the next timeslot.

Figure 8:
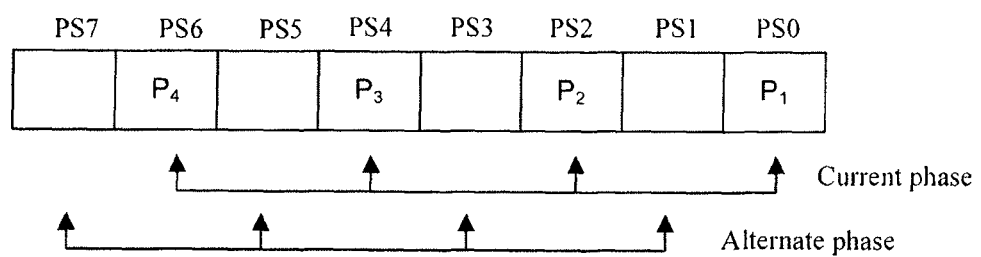
FIG. 8 is a schematic illustration of the scheduling pipeline of FIG. 7 in use.

As an example, and as shown in FIG. 8, if 4 multi-cell candidate data packets denoted P1 to P4 become available simultaneously, all requiring transmission at the low 4×-SDR data rate, and assuming a completely empty pipeline, a first cell of the first candidate data packet P1 will be selected for transmission in the first timeslot PS0 (which is part of the first phase). In the following timeslot PS1 (which is part of the second phase), all three remaining candidate data packets will be deferred (since each of these data packets can be scheduled in the first phase so as to keep the second phase empty). In the third timeslot (which is part of the first phase), a first cell of deferred candidate data packet P2 is selected for transmission. In the fourth timeslot (which is again part of the second phase), both the remaining candidate data packets P3 and P4 will again be deferred. The first cell of the third candidate data packet P3 will be scheduled for transmission in the fifth timeslot PS4 (which is part of the first phase). In the sixth timeslot PS5, the remaining candidate data packet P4 is deferred yet again, and transmission of its first cell is scheduled in the seventh timeslot PS 6. Thus it can be seen that the four data packets fill the first phase, leaving the second phase empty.

Processing carried out by the scheduler is now described in further detail with reference to FIGS. 9 and 10. The pipeline referred to is that shown in FIG. 7.

Figure 9:
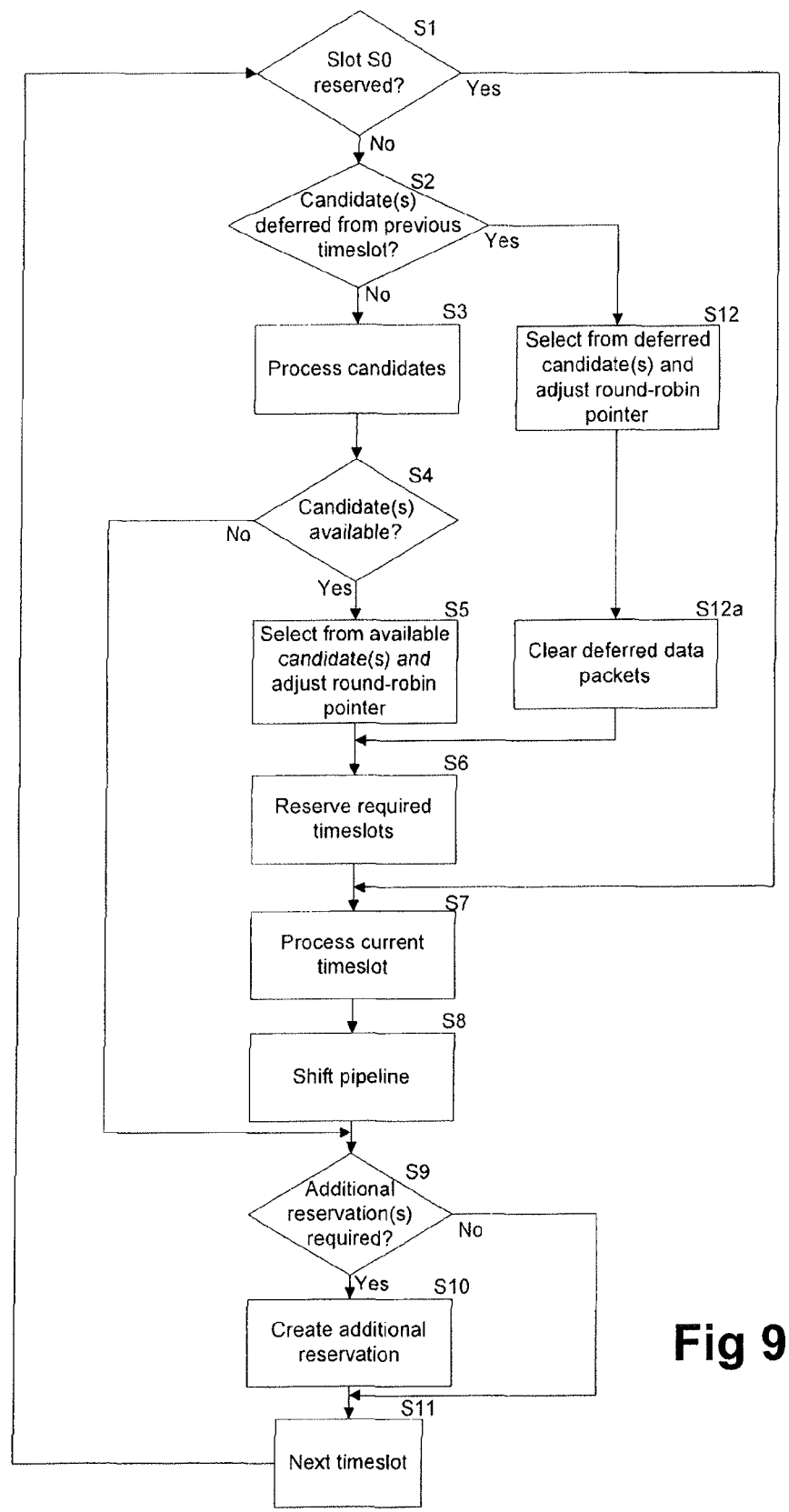
FIG. 9 is a flowchart showing processing carried out by the scheduler of the ingress module of FIG. 2 using the scheduling pipeline of FIG. 7.

Referring to FIG. 9, at step S1 it is determined whether the current pipeline slot, slot PS0, is reserved. If it is determined that the current slot PS0 is not reserved, processing passes to step S2 where it is determined if there are deferred candidate data packets from processing carried out at the previous timeslot. That is, at step S2 it is determined whether there are data packets which were processed but not scheduled for transmission at the previous time slot on the basis that they could be more efficiently scheduled in the phase associated with the current timeslot.

If at step S2 it is determined that there are no deferred candidate data packets from a previous timeslot, processing passes to step S3 where all data packets currently offered by the ingress arbiter as candidate data packets are processed. Processing of the candidate data packets at step S3 is described in further detail with reference to FIG. 10, and results in a determination of whether any of the candidate data packets offered by the ingress arbiter can be scheduled for transmission.

From step S3, processing passes to step S4 where it is determined whether the processing of step S3 resulted in any candidate data packets available for scheduling in the current timeslot. If it is determined that there are candidate data packets available for scheduling in the current timeslot, one of the available candidate data packets is selected for scheduling at step S5. Where a single candidate data packet is available for scheduling, that candidate data packet is chosen. Where there are a plurality of data packets available for scheduling in the current timeslot, selection may be based upon any appropriate selection mechanism, for example round-robin selection. In such a case a round-robin pointer used as a basis for the selection is updated. Processing passes from step S5 to step S6 where timeslots required by the data packet selected at step S5 are reserved by the scheduler in the pipeline. The timeslots which are reserved are determined by the rate at which the data packet is to be transmitted, as described above.

From step S6 processing passes to step S7 where the current timeslot is processed. That is, if a cell is to be transmitted in the timeslot represented by pipeline slot PS0, that cell is transmitted to its destination egress port. Processing passes from step S7 to step S8 where the pipeline is shifted by one space in the manner described above. It is then determined at step S9 whether the data packet previously in slot PS0 of the pipeline requires additional pipeline slot reservations. If it is determined that additional reservations are required, processing passes to step S10 where an additional reservation is created in the pipeline slot PS7. Processing passes from step S10 to step S11 where the next timeslot is initiated before processing returns to step S1.

If, at step S2, it is determined that there are candidate data packets deferred from the previous timeslot, processing passes to step S12. At step S12 one of the deferred candidate data packets is chosen (for example by round robin selection) for scheduling in the current timeslot. Again, where round-robin selection is used, a round-robin pointer is updated at step S12. Processing passes from step S12 to step S12a. Here, any deferred data packets not selected at step S12 are cleared such that they are no longer treated preferentially. Processing passes from step S12a to step S6. In this way it can be seen that deferred data packets are preferentially processed. However, such preferential processing is limited to a single time slot.

If, at step S4, it is determined that there are no candidate data packets available for scheduling in the current timeslot, processing passes directly from step S4 to step S8 where the pipeline is shifted in the manner described above.

If, at step S9, it is determined that no additional reservations are required, processing passes directly from step S9 to step S11.

The processing carried out by the scheduler of data at step S3 of FIG. 9 is now described with reference to FIG. 10. The processing described with reference to FIG. 10 is performed for each data packet offered by the ingress arbiter as a candidate data packet for selection by the scheduler for scheduling.

Figure 10:
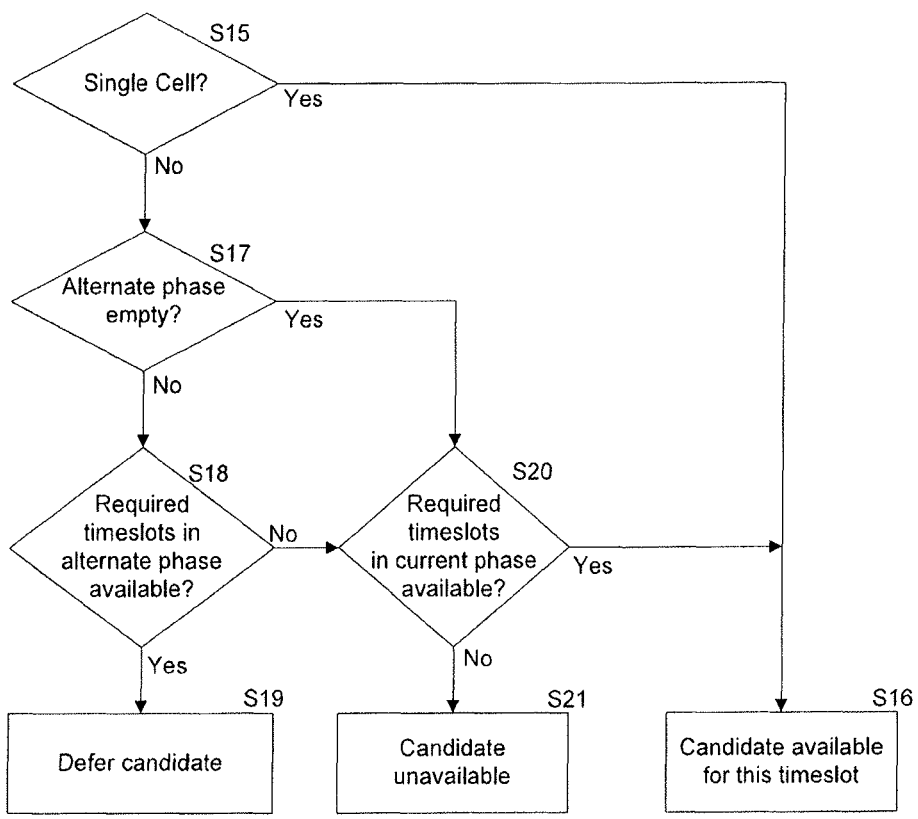
FIG. 10 is a flowchart showing part of the processing of FIG. 9 in further detail.

Referring to FIG. 10, at step S15 it is determined whether a processed data packet comprises only a single cell. If this is the case, processing passes directly to step S16 where the candidate data packet is indicated to be available for selection in the current time slot, given that no inter-cell dependencies need be considered.

If it is determined that the data packet is not a single cell data packet, processing passes to step S17 where it is determined if the alternate phase of the scheduling pipeline is empty (that is, it is determined whether each of pipeline reservation slots PS1, PS3, PS5, PS7 are unreserved). If it is determined that the alternate phase of the scheduling pipeline is not empty, processing passes to step S18 where it is determined whether the pipeline reservation slots which would be required by the cells of the processed data packet are unreserved in the alternate phase. If it is determined that the required pipeline slots are available in the alternate phase, scheduling of the data packet is deferred until a subsequent timeslot at step S19. The processing of steps S17 to S19 is such that if some data packets are already scheduled for transmission in the alternate phase, where possible, a candidate data packet is also scheduled for transmission in the alternate phase, thereby tending to keep the current phase empty, while maximising use of the alternate phase.

If, at step S17 it is determined that the alternate phase is empty, processing passes from step S17 to step S20. At step S20 a check is carried out to determine whether the pipeline slots of the current phase required to schedule transmission of the candidate data packet are available. If this is the case, processing passes from step S20 to step S16 where the candidate data packet is indicated as being available for transmission in the current time slot. If the check of step S20 determines that the required pipeline slots are not available, processing passes to step S21 where it is indicated that the candidate is not available for selection at the current timeslot.

The processing of steps S17, S20 and S21 or S16 is such that where nothing is scheduled for transmission in the alternate phase, there is no preference to transmit a currently processed candidate data packet in that alternate phase. This is because, if the alternate phase is empty, it is preferable to keep the alternate phase empty for future, potentially higher speed, transmissions, for the reasons set out above, and therefore preferable to attempt to schedule the processed data packet in the current phase.

Where, at step S18, it is determined that the required pipeline slots in the alternate phase are not available, processing passes from step S18 to step S20. At step S20 it is determined whether the required pipeline slots in the current phase of the pipeline are available. If it is determined that the required pipeline slots in the current phase are available, processing passes to step S16 where the candidate data packet is deemed available for scheduling. If, on the other hand, at step S20 it is determined that the required pipeline slots in the current phase are not available, processing passes to step S21, where the candidate data packet is deemed unavailable for selection in the current timeslot. The inclusion of step S18 ensures that a data packet is only deferred when there is capacity in the alternate phase to schedule transmission of the data packet.

To illustrate the processing described above with reference to FIGS. 9 and 10 an example of data packet scheduling is now presented with reference to FIGS. 11 to 19. In the following description, reference is made to steps of the flowcharts of FIGS. 9 and 10. The description is based upon a single scheduler provided by one of the ingress modules.

The following example is based upon the switch 1 of FIG. 1 where the egress port 6 is connected to an egress link running at 4×DDR, the egress port 7 is connected an egress link running at 4×SDR and the egress ports 8, 9 are each connected egress links running at 8×DDR. It is to be understood that the ingress arbiter 19 is configured to select up to two data packets simultaneously to act as candidate data packets for selection by the scheduler 24.

Figure 11:
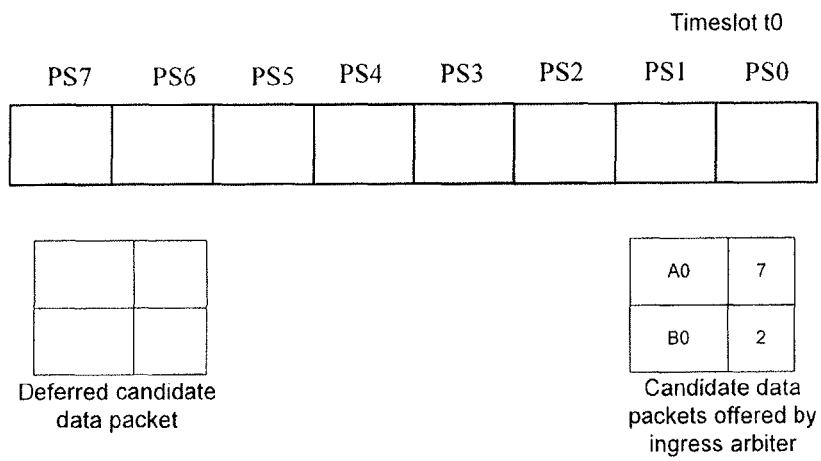
FIGS. 11 to 19 are schematic illustrations of the scheduling pipeline of FIG. 7 in use according to the processing of FIGS. 9 and 10.

Referring to FIG. 11, the state of a pipeline used by the scheduler 24 of the ingress module 10 is shown at a timeslot t0. It can be seen that the pipeline is empty. The ingress arbiter 19 has selected two data packets as candidate data packets for selection by the scheduler 24, a data packet A0 is destined for the egress port 6 and a data packet B0 is destined for the egress port 7. The data packet A0 comprises seven cells, while the data packet B0 comprises 2 cells. The ingress arbiter 19 provides data to the scheduler 24 indicating where the first cell of each candidate data packet can be found in the relevant ingress buffer.

The current pipeline slot PS0 is empty (step S1) and there are no candidate data packets deferred from a previous timeslot (step S2). Each of the currently offered candidate data packets are therefore processed according to FIG. 10 (step S3).

Considering first the data packet A0, the data packet A0 is not a single cell data packet (step S15), the alternate phase is empty (step S17) and the required future pipeline slots in the current phase (only the slot PS4), are available (step S20). The data packet A0 is therefore considered to be available for processing in this timeslot (step S16).

The data packet B0 is not a single cell data packet (step S1), the alternate phase is empty (step S17) and only the pipeline slot PS0 (which is empty) is required in the current phase (step S20) as the data packet B0 is destined for the egress port 7 operating at 4×SDR. The data packet B0 is therefore also considered to be available for processing in this timeslot (step S16).

Figure 12:
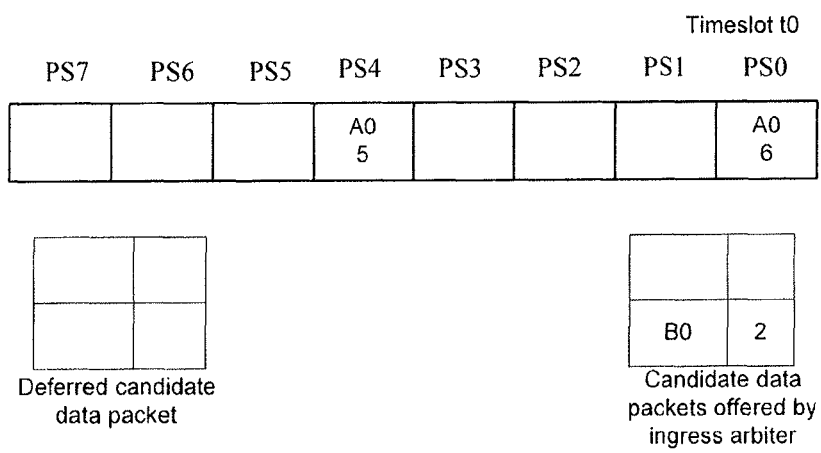

The data packets A0 and B0 are therefore both available for selection (step S4). The data packet A0 is chosen (step S5) and the current pipeline slot PS0, and future pipeline slot PS4 (given that the data packet A0 is destined for an egress port operating at the 4×DDR transmission rate) are reserved for cells of the data packet A0 (step S6). The reservation at the slot PS0 is stored with a cell sequence number 6 while the reservation at the slot PS4 is stored with a cell sequence number 5. The state of the pipeline after the processing of step S6 is shown in FIG. 12.

Figure 13:
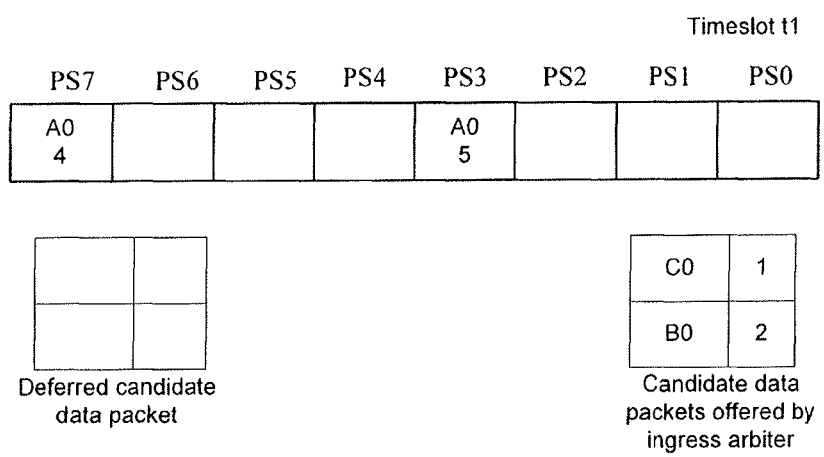

The current timeslot is processed (step S7) such that a cell of the data packet A0 is transmitted across the switching core 18 to the egress module 14 and the pipeline is shifted (step S8). An additional reservation is made for the data packet A0 at the pipeline slot S7 with a cell sequence number 4 (step S10). FIG. 13 illustrates the state of the pipeline at start of the timeslot t1.

Referring to FIG. 13, the data packet A0 has reservations in pipeline slots PS3 and PS7. The ingress arbiter has made available a data packet C0 destined for the egress port 8 and comprising a single cell.

The current slot, PS0, is not reserved (step S1) and there are no deferred cells from a previous timeslot (step S2). The current candidate data packets, B0 and C0 are therefore processed (step S3).

The data packet B0 is not a single cell data packet so the scheduler determines if the alternate phase is empty (step S17). As the alternate phase is not empty (i.e. pipeline slots PS3 and PS7 are reserved), it is determined whether the pipeline slots required by the data packet B0 are reserved (step S18). As the data packet B0 is a two-cell data packet destined for an egress port connected to an egress link operating at 4×SDR, only the pipeline slot PS1 would be required for scheduling in the alternate phase. As the pipeline slot PS1 is available, the data packet B0 is deferred (step S19).

The data packet C0 is a single cell data packet so it is unnecessary to consider future pipeline slots. The data packet C0 is therefore considered available for scheduling in the current phase (steps S15 and S16).

Figure 14:
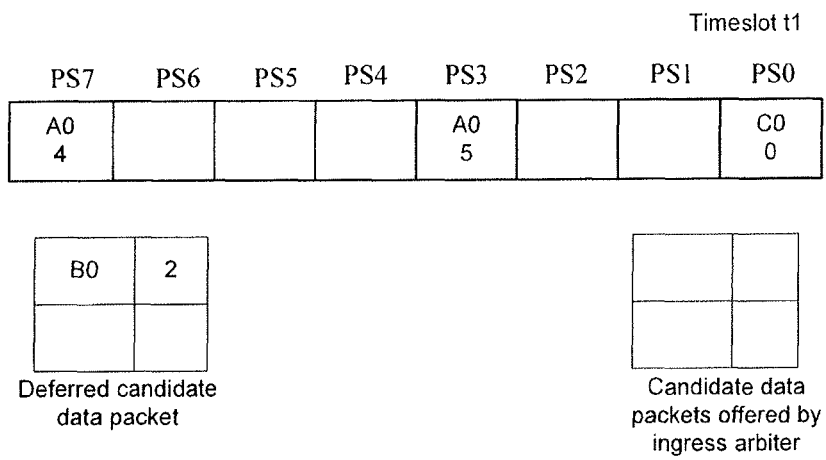

As the only candidate data packet available for scheduling is the data packet C0, the data packet C0 is selected for scheduling and its single cell is scheduled in the pipeline slot PS0 with a cell sequence number of 0. FIG. 14 illustrates the state of the pipeline after the processing described above.

The current timeslot (step S7) is processed such that the single cell of the data packet C0 is transmitted through the switch core 18 to the egress module 16 and the pipeline is shifted (step S8). There are no currently scheduled data packets requiring a further reservation in the pipeline slot PS7.

Figure 15:
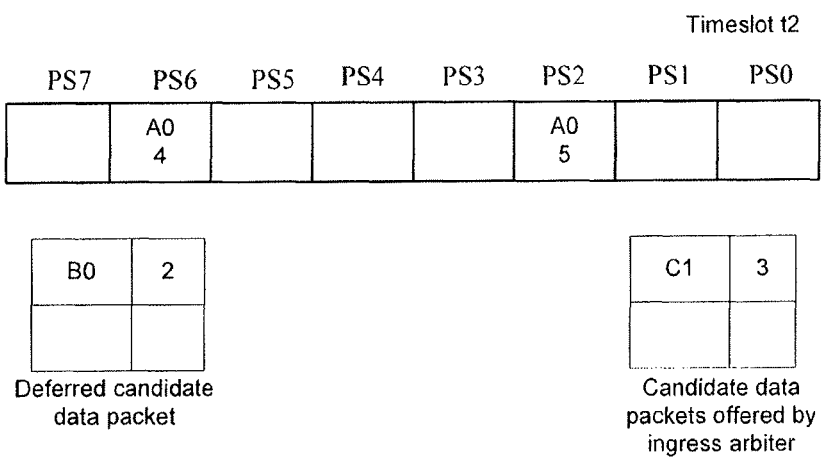

FIG. 15 illustrates the state of the pipeline at the start of the timeslot t2.

Referring to FIG. 15, the reservations of the data packet A0 are now in pipeline slots PS2 and PS6. The ingress arbiter 19 has made available a new data packet, C1 destined for the egress port 8 and comprising three cells. The current timeslot PS0 is empty, and the data packet B0 is deferred from the previous timeslot. As deferred data packets have priority over other potentially available data packets, the data packet C1 is not considered for scheduling in this timeslot (step S2).

Figure 16:
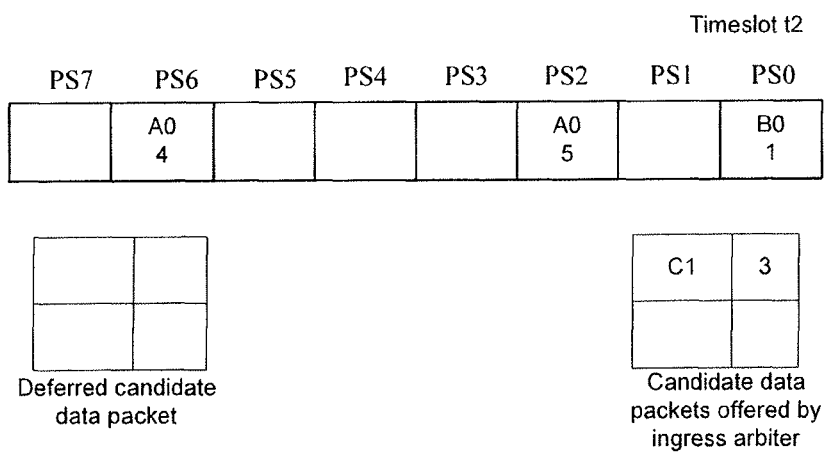

The data packet B0 is the only deferred data packet and is therefore selected for scheduling in the current timeslot (step S12). The data packet B0 has two cells and requires a reservation every eight timeslots as it is destined for the egress port 7. Therefore only one reservation is made, with a cell sequence number 1, in the pipeline slot PS0. The state of the pipeline is illustrated in FIG. 16.

The first cell of the data packet B0 is transmitted to the egress module 16 (step S7) and the pipeline is shifted (step S8). A reservation is made in the pipeline slot PS7 for the remaining cell of the data packet B0 (step S10).

Figure 17:
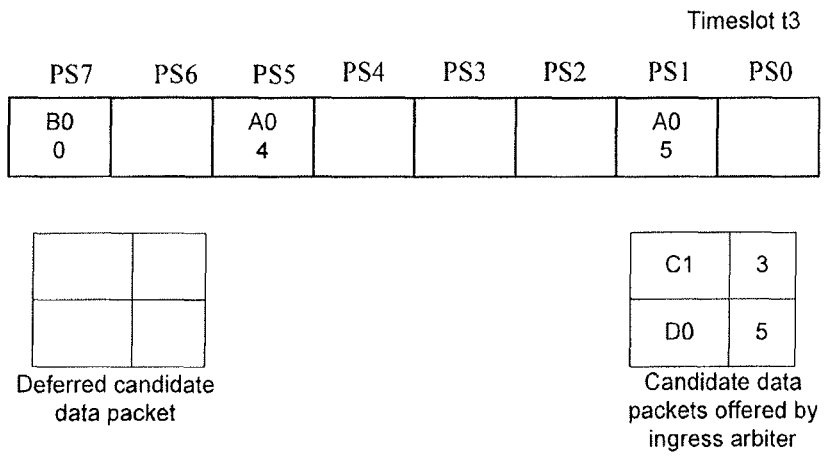

FIG. 17 illustrates the state of the pipeline at the beginning of the timeslot t3.

Referring to FIG. 17, the reservations for the data packet A0 are now in pipeline slots PS1 and PS5, while the final reservation for the data packet B0 is in the pipeline slot PS7. The ingress arbiter 19 has made available a further data packet, D0, destined for the egress port 9 and comprising five cells.

The current slot, PS0, is not reserved (step S1) and there are no deferred cells (step S2). The offered data packets are therefore processed according to FIG. 10 (step S3).

The data packet C1 is not a single cell packet (step S15) and the alternate phase is not empty (step S17). The scheduler therefore checks if the required timeslots in the alternate phase are reserved (step S18). The data packet C1 has three cells and is destined for the egress port 8, connected to an egress link operating at 8×DDR. The data packet C1 therefore requires the pipeline slots PS1, PS3, PS5 for scheduling in the alternate phase. The pipeline slots PS1, PS5 are reserved so the scheduler determines whether the required timeslots are available in the current phase (step S20). For scheduling in the current phase the data packet C1 requires timeslots PS0, PS2, PS4, each of which is available. The data packet C1 is therefore available for scheduling in the current phase (step S16).

The data packet D0 is similarly processed. The data packet D0 is not a single cell data packet (step S15) and would require slots PS1, PS3, PS5 for scheduling in the alternate phase (step S18). The pipeline slots PS1, PS5 are reserved so the scheduler determines whether the required timeslots are available in the current phase (step S20). For scheduling in the current phase, the data packet D0 requires PS0, PS2, PS4, PS6, each of which are available (step S20). The data packet D0 is therefore also available for scheduling in the current phase (step S16).

Figure 18:
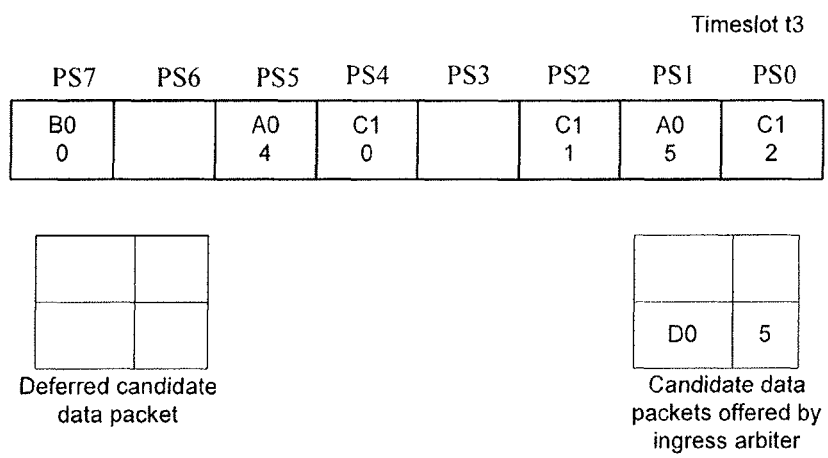

Both the data packet C1 and the data packet D0 are available as candidates for scheduling in the current phase. The data packet C1 is selected according to a round robin selection method, as the data packet C1 is the older candidate. The pipeline slot PS0 is reserved for the first cell of the data packet C0 with a cell sequence number of 2, the pipeline slot PS2 is reserved with a cell sequence number of 1 and the pipeline slot PS4 is reserved with a cell sequence number of 0. The state of the pipeline at the end of the timeslot t3 is illustrated in FIG. 18.

The current timeslot is processed (step S7) such that the first cell of the data packet C1 is transmitted to the egress module 15 and the pipeline is shifted (step S8). No new reservations are made in the pipeline slot PS7 (step S9).

Figure 19:
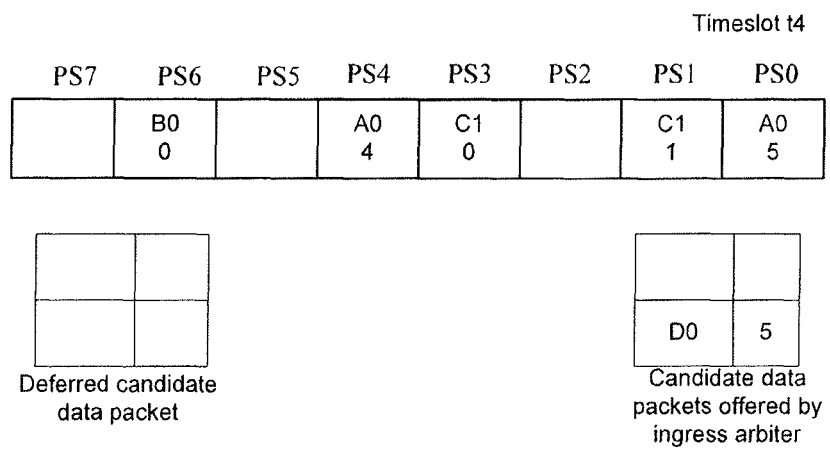

FIG. 19 illustrates the state of the pipeline at the start of the timeslot t4.

Referring to FIG. 19, there are now reservations for the data packet A0 at the pipeline slots PS0, PS4, reservations for the data packet C1 at the pipeline slots PS1, PS3 and a reservation for the data packet B0 at the pipeline slot PS6.

As the pipeline slots PS0 and PS1 are reserved, no new data packets are scheduled until the second cell of the data packet C1 has been transmitted (step S1). Processing then proceeds as described above.

It will be appreciated that embodiments of the present invention can be implemented in any convenient way. For example the switch of FIG. 1 may be a hardware device comprising random access memory arranged to store the ingress buffers and a processor arranged to control receipt and transmission of data packets as well as to control operation of components of the switch. The processor may take any convenient form including an application specific integrated circuit or a general-purpose microprocessor which is appropriately programmed.

Further, it will be appreciated that while the credit state indicator has been described in terms of a bit flag stored in each egress module, in other embodiments, the credit indicator may be a signal which is broadcast from the egress module to each ingress module, wherein the ingress module updates a stored credit state for each of the egress modules upon receipt of the credit state indicator.

While it is the case that the embodiments of the present invention as described above have particular relevance to PCI Express switches, the method is generally applicable to any switching application where it is necessary to send data packets from an input to a plurality of outputs where the output is any combination of a port, a link, a virtual channel or a traffic class. One example of an alternative protocol with which embodiments of the invention can be used is Infiniband.

Although the switch 1 has been described as having four ingress ports and four egress ports it will be appreciated that in many embodiments of the invention switches with greater numbers of ingress and egress ports will be provided. It will be appreciated that equal numbers of ingress and egress ports allow that same number of devices to be bidirectionally coupled to the switch. It will however be appreciated that in alternative embodiments of the invention different numbers of ingress and egress ports may be provided.

Figure 20:
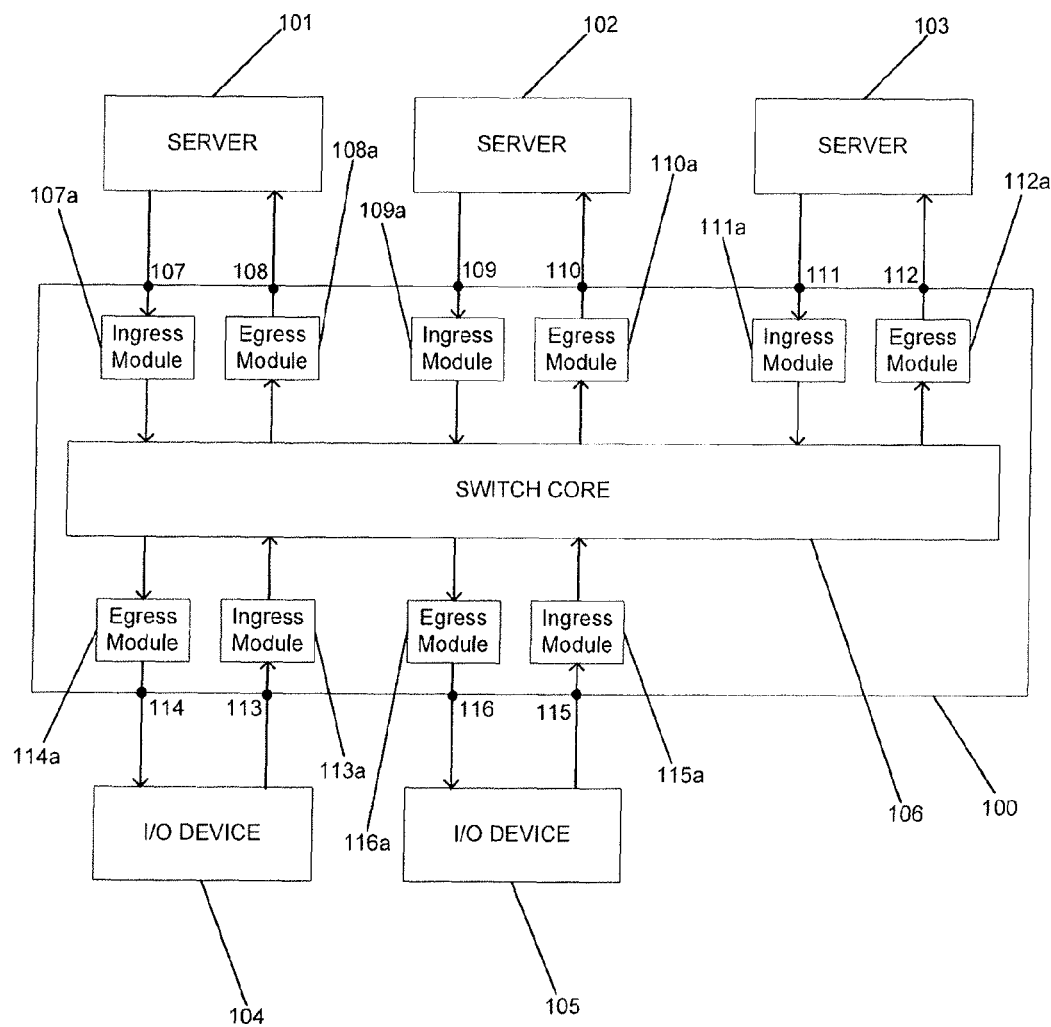
FIG. 20 is a schematic illustration of a switch in accordance with an embodiment of the invention connecting a plurality of input/output (I/O) devices to a plurality of servers.

Switches of the type described herein have a wide range of application. One particular application relates to the connection of a plurality of servers to a plurality of input/output (I/O) devices so that the plurality of servers each have shared access to each of the plurality of I/O devices. FIG. 20 is a schematic illustration of such an arrangement.

FIG. 20 shows a switch 100 connecting three servers 101, 102, 103 to two I/O devices 104, 105. The switch 100 comprises a switch core 106 arranged to direct data packets between ingress and egress ports of the switch.

The server 101 is connected to an ingress port 107 and to an egress port 108 of the switch 100. The ingress port 107 has an associated ingress module 107a of the type described above, while the egress port 108 has an associated egress port module 108a of the type described above. The connection of the server 101 to the ingress port 107 allows the server 101 to transmit data to the switch 100, while the connection of the server 101 to the egress port 108 allows data to be transmitted from the switch 100 to the server 101. The server 102 is similarly connected to an ingress port 109 having an associated ingress module 109a and to an egress port 110 having an associated egress module 110a, while the server 103 is connected to an ingress port 111 having an associated ingress module 111a and to an egress port 112 having an associated egress module 112a.

The I/O device 104 is connected to the switch 100 through an ingress port 113 having an associated ingress module 113a and through an egress port 114 having an associated egress module 114a. Similarly, the I/O device 105 is connected to the switch 100 through an ingress port 115 having an associated ingress module 115a and through an egress port 116 having an associated egress module 116a.

It will be appreciated that the arrangement shown in FIG. 15 allows resources provided by the I/O devices 104, 105 to be effectively shared by the servers 101, 102, 103.

Various modifications and applications of the present invention will be readily apparent to the appropriately skilled person from the teaching herein, without departing form the scope of the appended claims.

The invention claimed is:

1. An apparatus comprising a plurality of ingress ports and a plurality of egress ports, the apparatus being arranged to:
   receive through the ingress ports a data packet comprising a plurality of cells; and
   schedule, in a single scheduling operation, respective times to forward each of the plurality of cells of the data packet to at least one of the egress ports, the single scheduling operation comprising:
      determining a first time slot at which a first cell of the selected data packet is to be forwarded to the at least one of the egress ports, the first time slot being in one of a first phase or a second phase;
      determining a plurality of further time slots at which respective further cells of the plurality of cells are to be forwarded to the at least one of the egress ports, each respective further time slot being in the same phase as the first time slot;
   wherein cells of different data packets are forwarded in an interleaved manner.

2. The apparatus of claim 1, wherein the further times are determined according to a characteristic of the egress port to which the selected data packet is to be forwarded.

3. The apparatus of claim 2, wherein the characteristic is a data rate of an egress link associated with the one of the egress ports.

4. The apparatus of claim 1, wherein data packets received through the ingress ports are stored in at least one buffer and wherein the apparatus is arranged to:
generate a set of candidate data packets from packets stored in the at least one buffer; and
select a data packet to be forwarded from the set of candidate data packets.

5. The apparatus of claim 4, wherein generating a set of candidate data packets comprises determining whether a given data packet can be accepted by an egress port to which it is to be forwarded and including the given data packet in a set of candidate data packets only if the given data packet can be accepted by the egress port to which it is to be forwarded.

6. The apparatus of claim 4, wherein a plurality of sets of candidate data packets are created, each set comprising data packets received through a single one of the ingress ports; and
wherein the apparatus is arranged to make selections from the plurality of sets of candidate data packets separately from other selections from the plurality of sets of candidate data packets.

7. The apparatus of claim 1, further comprising a memory storing a data structure comprising an ordered plurality of slots, each slot being associated with a respective time;
wherein for any two adjacent slots of the data structure, a first slot is part of the first phase and a second slot is part of the second phase.

8. The apparatus of claim 7, wherein determining a first time slot comprises determining if cells are stored in slots of the second phase; and
if it is determined that cells are stored in slots of the second phase, attempting to store the first cell in a slot of the first phase.

9. The apparatus of claim 8, wherein if cells are stored in at least some slots of the second phase, but cells are not stored in determined slots of the second phase, the apparatus defers storing the first cell in a slot of the first phase.

10. The apparatus of claim 1, further comprising:
a plurality of ingress modules;
wherein each ingress module is arranged to, independently of each other ingress module:
receive data packets from a respective single one of the ingress ports;
store received data packets in at least one buffer of the ingress module;
select data packets from the at least one buffer as candidate data packets for forwarding to an egress port, and
schedule transmission of selected ones of the candidate data packets to destination egress ports according to the single scheduling operation.

11. The apparatus of claim 10, wherein the ingress modules are arranged to select candidate data packets and to select ones of the candidate data packets for scheduling in distinct operations.

12. The apparatus of claim 1, wherein the apparatus is a PCI Express switch.

13. A method, comprising:
receiving through one of a plurality of ingress ports a data packet comprising a plurality of cells;

scheduling, in a single scheduling operation, respective times to forward each of the plurality of cells of the data packet to at least one of a plurality of egress ports, the single scheduling operation comprising:
determining a first time slot at which a first cell of the selected data packet is to be forwarded to the at least one of the egress ports, the first time slot being in one of a first phase or a second phase;
determining a plurality of further time slots at which respective further cells of the plurality of cells are to be forwarded to the at least one of the egress ports, each respective further time slot being in the same phase as the first time slot; and
receiving further data packets through ones of the plurality of ingress ports and scheduling cells of different data packets in an interleaved manner.

14. The method of claim 13, wherein the further times are determined according to a characteristic of the egress port to which the selected data packet is to be forwarded.

15. The method of claim 13, further comprising storing the received data packets in at least one buffer;
generating a set of candidate data packets from data packets stored in the at least one buffer; and
selecting a data packet to be forwarded from the set of candidate data packets.

16. The method of claim 13, wherein generating a set of candidate data packets comprises determining whether a given data packet can be accepted by an egress port to which it is to be forwarded and including the given data packet in a set of candidate data packets only if the given data packet can be accepted by the egress port to which it is to be forwarded.

17. The method of claim 13, further comprising creating a plurality of sets of candidate data packets, each of said plurality of sets comprising data packets received through a single one of the plurality of ingress ports; and
making selections from the plurality of sets of candidate data packets separately from other selections from the plurality of sets of candidate data packets.

18. The method of claim 13, wherein determining a first time slot comprises determining if cells are stored in slots of a data structure associated with the second phase; and
if it is determined that cells are stored in slots of a data structure associated with the second phase, attempting to store the first cell in a slot of the data structure corresponding first phase;
wherein the data structure comprises an ordered plurality of slots, each slot being associated with a respective time and wherein for any two adjacent slots of the data structure, a first slot is part of the first phase and a second slot is part of the second phase.

19. The method of claim 18, wherein if cells are stored in at least some slots of the data structure associated with the second phase, but cells are not stored in determined slots associated with the second phase, the method comprises deferring storing the first cell in a slot of the first phase.

20. A non-transitory carrier medium carrying a computer program arranged to cause an apparatus to:
receive through one of a plurality of ingress ports a data packet comprising a plurality of cells;
schedule, in a single scheduling operation, respective times to forward each of the plurality of cells of the data packet to at least one of a plurality of egress ports, the single scheduling operation comprising:
determine a first time slot at which a first cell of the selected data packet is to be forwarded to the at least one of the egress ports, the first time slot being in one of a first phase or a second phase;

determine a plurality of further time slots at which respective further cells of the plurality of cells are to be forwarded to the at least one of the egress ports, each respective further time slot being in the same phase as the first time slot; and receive further data packets through ones of the plurality of ingress ports and schedule cells of different data packets in an interleaved manner.

* * * * *